United States Patent [19]

Andrä et al.

[11] 4,401,135
[45] Aug. 30, 1983

[54] TUBULAR CASING WITH GLUED SEAM AND PROCESS FOR ITS MANUFACTURE

[75] Inventors: Klaus Andrä, Zornheim; Elfriede Hutschenreuter, Bad Schwalbach; Walter Seifried, Wiesbaden, all of Fed. Rep. of Germany

[73] Assignee: Hoechst Aktiengesellschaft, Frankfurt am Main, Fed. Rep. of Germany

[21] Appl. No.: 250,728

[22] Filed: Apr. 3, 1981

[30] Foreign Application Priority Data

Apr. 5, 1980 [DE] Fed. Rep. of Germany ....... 3013320

[51] Int. Cl.³ .................... F16L 11/00; A22C 13/00
[52] U.S. Cl. ................................ 138/118.1; 138/154; 138/156; 138/170; 138/124; 428/36; 426/105; 426/135; 426/414
[58] Field of Search ............... 428/36; 138/118.1; 426/105, 135, 140, 412, 413, 414, 513

[56] References Cited

U.S. PATENT DOCUMENTS

| | | |
|---|---|---|
| 2,000,835 | 5/1935 | Goldberger . |
| 2,136,566 | 11/1938 | Schnecko et al. . |
| 2,148,884 | 2/1939 | Walter . |
| 2,181,887 | 12/1939 | Goodman . |
| 2,210,436 | 8/1940 | Weingand et al. ........... 138/118.1 |
| 2,226,442 | 12/1940 | Rumsey, Jr. . |
| 2,226,442 | 12/1940 | Nutley . |
| 2,461,975 | 2/1949 | Fuller . |
| 2,573,956 | 11/1951 | Daniel, Jr. . |
| 2,607,696 | 8/1952 | Kunz . |
| 2,608,488 | 8/1952 | Rumsey, Jr. .............. 138/118.1 |
| 2,653,432 | 9/1953 | Wright et al. . |
| 2,685,769 | 8/1954 | Conti . |
| 2,685,770 | 8/1954 | Conti . |
| 2,686,725 | 8/1954 | Cornwell . |
| 2,748,027 | 5/1956 | Meier . |
| 2,757,495 | 8/1956 | Reichel . |
| 2,767,435 | 10/1956 | Alles . |
| 2,773,773 | 12/1956 | Harder et al. . |
| 2,819,488 | 1/1958 | Gimbel . |
| 2,857,283 | 10/1958 | Firth et al. ................ 138/118.1 |
| 2,925,621 | 2/1960 | Parth . |
| 2,961,323 | 11/1960 | Underwood et al. . |
| 2,961,340 | 11/1960 | Meier . |
| 2,999,788 | 9/1961 | Morgan . |
| 3,108,017 | 10/1963 | Messwarb et al. . |
| 3,144,425 | 8/1964 | Koch et al. . |
| 3,378,379 | 4/1968 | Shiner . |
| 3,545,161 | 12/1970 | Hoshino et al. . |
| 3,546,209 | 12/1970 | Lipps, Jr. . |
| 3,594,857 | 7/1971 | Michl . |
| 3,619,854 | 11/1971 | Ilgen et al. . |
| 3,679,435 | 7/1972 | Klenk et al. . |
| 3,766,603 | 10/1973 | Urbutis et al. . |
| 3,826,676 | 7/1974 | Heling et al. . |
| 3,852,224 | 12/1974 | Bridgeford . |
| 3,884,270 | 5/1975 | Rasmussen . |
| 3,988,804 | 11/1976 | Regner et al. . |
| 4,185,358 | 1/1980 | Regner et al. . |
| 4,356,199 | 10/1982 | Hammer et al. ........... 426/105 |
| 4,356,200 | 10/1982 | Hammer et al. ........... 426/105 |

FOREIGN PATENT DOCUMENTS

| | | |
|---|---|---|
| 14346 | 8/1980 | European Pat. Off. . |
| 14353 | 8/1980 | European Pat. Off. . |
| 886863 | 8/1953 | Fed. Rep. of Germany . |
| 1908851 | 1/1970 | Fed. Rep. of Germany . |
| 2832926 | 7/1980 | Fed. Rep. of Germany . |
| 2102508 | 3/1972 | France . |
| 2336884 | 7/1977 | France . |
| 784920 | 10/1957 | United Kingdom . |
| 865727 | 4/1961 | United Kingdom . |
| 908205 | 10/1962 | United Kingdom . |
| 1240560 | 7/1971 | United Kingdom . | ary Examiner—William R. Dixon, Jr.
ney, Agent, or Firm—Schwartz, Jeffery, Schwaab, k, Blumenthal & Koch

ABSTRACT ular casing for foodstuffs, in particular sausages, rising a web (4) which is curved along its longitu-axis and having its longitudinal edge regions (1, 2) d by a glued seam. The edge regions (1, 2) meet or ap and are bonded with a strip of film (6). A pres-ensitive adhesive is used for the bonding. The ir casing carries an adhesion-promoting layer (5) surface adjacent to the adhesive layer (3). Prefer-he strip of film and the edge regions of the web mprised of a smoke-permeable material, and op-y the pressure-sensitive adhesive layers also have e-permeable structure, such as perforations. The tubular casing can also be shirred.

22 Claims, 9 Drawing Figures

TUBULAR CASING WITH GLUED SEAM AND PROCESS FOR ITS MANUFACTURE

BACKGROUND OF THE INVENTION

The present invention relates to a tubular casing and to a process for its manufacture. More particularly, the invention relates to a tubular casing made from a web, for example, of regenerated cellulose, by folding the web along the longitudinal axis and gluing the over-lapping edge zones running along the longitudinal axis. See, e.g., U.S. Pat. No. 2,148,884, No. 2,226,442, No. 2,685,769, No. 2,685,770 and No. 2,757,495. The gluing operations hitherto described, however, comprise either the use of solvents with which the surface of the web is partly dissolved and is tackified, whereupon an "adhesive" is produced in situ on the surface of the web, or the use of webs which are coated with a thermoplastic resin or consist of a thermoplastic material which can be sealed when heat and pressure are applied. See, e.g., U.S. Pat. No. 2,773,773. Acrylates which can be tackified by application of heat or by means of a solvent are also mentioned as examples of suitable resins in U.S. Pat. No. 2,653,432. Furthermore, it has already been proposed to use an acid solution of a water-soluble, partially polymerized thermosetting resin as the adhesive agent, with polymerization of the resin being accelerated by the presence of an acid (pH 4.5–5.5) in the aqueous solution. In U.S. Pat. No. 2,607,696, examples of these resins which are mentioned are aminoplast resins, such as urea/formaldehyde or melamine/formaldehyde resin, ketone/formaldehyde resins and phenolic resins which are hardened at 180° to 220° C. and thereby glue the overlapping edge regions which have been pressed together. U.S. Pat. No. 2,686,725 proposes a process in which the thermosetting resin, for example, a melamine/formaldehyde resin, is applied in acid solution, for example, to the still moist fiber-free cellulose gel which has not yet been dried, and a heat-sealing layer of polyethylene resin in the form of a tape or as a powder is melted onto the subsequently hardened resin. In order to bond the overlapping edge regions of the cellulose hydrate web, the polyethylene is melted under the application of pressure and elevated temperature and the overlapping edges are heat-sealed to one another.

It is common to all these tubular casings that they can be manufactured only in a relatively troublesome manner, i.e., at high temperatures, with long residence times until the adhesive has set and with the aid of acids or organic solvents which can be removed from the tubular casing only with difficult and very expensive measures. Furthermore, they are not sufficiently permeable to gas and smoke in the gluing region. For these reasons, tubular casings have for many years been predominantly manufactured without a seam; however, because of the relatively slow web speed, this tubular spinning process is very costintensive and permits only a limited tube diameter. In addition, it is not entirely possible to achieve a uniform tube diameter and wall thickness; and finishing processes, for example, coating the inside of the tube, are very complicated and expensive to carry out. In addition, in the field of tubular casings which are provided with a lengthwise seam, there have been hardly any publications in recent years which give an indication as to how the problems mentioned above could be overcome.

SUMMARY OF THE INVENTION

It is thus an object of the present invention to provide an improved tubular casing.

It is more particularly an object of the invention to provide a tubular casing of the above-mentioned type which can be manufactured in a relatively simple and inexpensive manner, i.e., at normal room temperature, with relatively short residence times and without the aid of acids and additional solvents, by gluing its two edge regions along the lengthwise axis.

A further object of the invention is to provide a tubular casing suitable for the packaging of foodstuffs, in particular, sausage mixtures, wherein the tubular casing and, in particular, the glued seam can withstand exposure to relatively severe mechanical load and to relatively high temperatures, for example, elongation stresses and the action of hot water, and does not impair the flavor and appearance of the foodstuff.

Still another object of the invention is to provide a tubular casing having a cross-section which is free from creases and is as uniform as possible.

An essential object of the present invention is furthermore to provide a tubular casing wherein the glued seam is permeable to gas and smoke while simultaneously having a high tear strength.

It is also an object of the invention to provide an improved process for preparing the tubular casing according to the invention.

In accomplishing the foregoing objects, there has been provided in accordance with the present invention a tubular casing suitable for containing foodstuffs, comprising a web of material curved about its longitudinal axis in such a manner that its two longitudinal edge regions lie contiguous to one another to form a seam; a layer of a substantially water-insoluble adhesion promoting resin covering at least one of the inside and outside surfaces of said web in at least the area of said two edge regions; a strip of film applied to said longitudinal contiguous edge regions forming the seam; and a layer of a pressure-sensitive adhesive interposed between said strip of film and the edge regions of said web material, whereby the seam is sealed by said strip of film via said layer of pressure-sensitive adhesive and said layer of adhesion-promoting resin. The strip of film overlies either the inside and/or the outside surfaces of the web. In another embodiment, the edge regions overlap one another and, optionally, a strip of film is interposed between the overlapped edge regions. According to still another embodiment, the strip of film, if used, and the edge zones are permeable to smoke, and the layer of pressure-sensitive adhesive includes openings to improve the permeability to smoke. The tubular casing may also be shirred, with the seam region arranged spirally around the lengthwise axis of the shirred tubular casing in at least a part of the tubular casing.

In accordance with another aspect of the present invention, there has been provided a process for manufacturing a tubular casing of the above-described type comprising the steps of curving a web of material about its longitudinal axis in such a manner that its two longitudinal edge regions lie contiguous or overlapped to one another to form a tube having a seam; before or after the curving step, applying a layer of a substantially water-insoluble adhesion-promoting resin to either the inside and/or outside surfaces of the web in at least the area of the two edge regions; and bonding the two contiguous edge regions together by means of a strip of film applied thereto and a layer of a pressure-sensitive adhesive interposed between the web and the strip of film, and, alternatively, bonding the overlapped edge regions together by means of a layer of a pressure-sensitive adhesive interposed between the overlapped edge regions; optionally bonding the overlapped edge regions by means of a strip of film applied thereto and a layer of a pressure-sensitive adhesive interposed between the edge regions and the strip of film.

Further objects, features and advantages of the present invention will become apparent to a person skilled in this art from the detailed description of preferred embodiments which follows, when considered together with the attached figures of drawing.

BRIEF DESCRIPTION OF THE DRAWINGS

In the drawings:

FIGS. 6 and 6a are schematic illustrations of one process for producing the tubular casings of the invention;

DETAILED DESCRIPTION OF PREFERRED EMBODIMENTS

Figure 1:
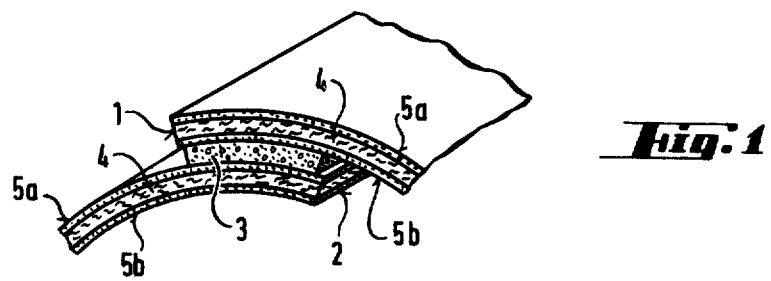
FIGS. 1, 2 and 3 are isolated cross-sectional views illustrating embodiments of the gluing regions of the tubular casing along the transverse axis.

According to the present invention, a sheet-like or web-like rectangular piece of film which is curved around its longitudinal axis, or a correspondingly curved, e.g., continuous film web, is converted into a tubular casing with a bonding seam running along the longitudinal axis by overlapping and gluing the edge regions running along the longitudinal axis. For simplicity, instead of "sheet-like or web-like pieces" and "continuous webs", the term "webs" is used in the following text to designate these starting materials. The layer containing the adhesive in the overlapping region can also be in the form of a tape, filament or strip. It is also possible for the edge zones to be bonded to one another in a manner such that the edges are brought together flush, i.e., such that the end faces are at least essentially pushed together, and are then bonded together with an adhesive using a tape or strip of film which covers the edge zone or both the edge zones. The strip of film is placed either on the outer side or on the inner side of the tubular casing, or strips of film which run parallel to one another are used, one being on the inner side and the other on the outer side of the tubular casing. A tape or strip of film can also be used if the edge zones overlap. In this case, the tape or strip of film has a layer of adhesive on both surfaces, whereby at least one layer contains a pressure-sensitive adhesive, and the tape or strip is located between the overlapping edge zones. In simplicity, the tape or strip is hereinafter referred to as a "strip of film".

The strip of film preferably consists of the same material as the tubular casing, for example, of cellulose hydrate. However, it is also possible to use a strip of film consisting of: paper; a stretch-oriented plastic film, such as a polyester, polyvinyl chloride or polypropylene film; a laminated film of two or more films, for example, containing an aluminum foil; a non-woven material, for example, a non-woven fiber material which is bonded by an adhesive, mechanically or by means of heat and which is comprised of spun fibers, filaments or multiple filament yarns of a synthetic or natural material which are deposited randomly or in ordered fashion; or a foamed film which has an open-cell or closed-cell foam structure, for example, of polyurethane or polystyrene.

Microporous films are also suitable, which term is intended to include membranes having a pore diameter such as that of, for example, membranes which are employed in reverse osmosis, ultrafiltration, dialysis or hemofiltration or as battery or fuel cell diaphragms. Such microporous films are manufactured, for example, by mixing a pulverulent substance, for example, polystyrene, starch, sugar, sodium chloride or sodium bicarbonate, with the base material, forming a sheet-like structure and extracting the pulverulent substance in order to form pores. See, e.g., U.S. Pat. No. 3,852,224. It is also possible to expose finely pulverulent thermoplastics to elevated temperatures in order to form a substance with a microporous structure by sintering. By means of another process, the gas absorbed in a thermoplastic is expanded under the action of heat, or alternatively the gas can also be produced by adding an agent which forms a gas under the action of heat. Porous sheet-like structures can also be formed by mixing an organic polymer with two volatile solvents which are miscible with one another, spreading the mixture out to form a layer and evaporating the solvents, whereupon the polymeric material coagulates to form a porous structure. In this process, the polymer is sparingly soluble or insoluble in one of the solvents. Finally, processes are also known in which the polymeric material is dissolved in a solvent and, in order to achieve coagulation, the solution is then brought into contact with a liquid precipitating agent which is miscible with the solvent.

For foodstuffs which are to be smoked, for example, sausages which are intended for boiling or scalding, uncooked sausages or certain types of cheese, particularly suitable materials are perforated or punched strips of film, or the said non-woven materials, foamed films and microporous films, which, because of their structure or their chemical composition, are capable of allowing the smoking fumes to pass through the bonding seam of the tubular casing. Tapes of a close-mesh woven fabric, network or lattice which, for example, are woven from filaments in the warp and weft are also suitable as strips of film for use in bonding the edge zones which are permeable to smoke.

Compact strips of film of a material which is permeable to smoke, for example, strips of regenerated cellulose film, can also be used, in which case it is not necessary for the strip of film to have an additional structure which is permeable to smoke, for example, in the form of pores or perforations.

In addition, in the case of a packaging casing which is to be used for foodstuffs which are to be smoked, the layer containing the adhesive is to be provided with a sufficient permeability to smoke, as described below.

Base materials which are used to manufacture the packaging casing are, in particular, webs of cellulose (cellophane, regenerated cellulose or cellulose hydrate) and cellulose derivatives, such as cellulose ethers, proteins, carbohydrates, collagens, alginates, starches and other naturally occurring or synthetic polymeric materials. Thus, cellulose webs which have been manufactured by the viscose process (U.S. Pat. No. 3,884,270), by denitration of cellulose nitrate or hydrolysis of other cellulose esters, for example, deacetylation of cellulose acetate with aqueous or alcoholic alkali solution (U.S. Pat. No. 3,546,209), can be employed. Other cellulose materials, such as cellulose ethers, for example, alkyl- or hydroxyalkyl-cellulose or mixed ethers, can also be glued to form tubes.

It is also possible to use webs which contain a fiber reinforcement, in particular, a web-like fiber reinforcement, for example, a paper web, such as the type containing fibers such as are used in the manufacture of paper or rice paper, or containing natural fibers, such as hemp fibers or flax fibers, or containing synthetic fibers, such as polyamide fibers, polyester fibers or polyacrylonitrile fibers. The web-like fiber reinforcement is, for example, a textile structure, such as a non-woven fiber material which has been bonded by an adhesive, mechanically or by means of heat and which is made of spinning fibers, filaments or multiple filament yarns of natural or synthetic materials which are deposited randomly or in an ordered fashion, or a woven material, network, lattice, knitted material or the like.

The fiber web is preferably treated on both sides with a viscose solution, in particular by being immersed in a viscose solution or coated with a viscose solution, e.g., using nozzles, rollers or spraying devices, and then the viscose solution is converted into regenerated cellulose. It is also possible for about 10 to 80% by weight of reinforcing fibers, which suitably have an average fiber length of 0.05 to 15 mm, to be incorporated into the viscose. The fibers consist of organic synthetic fibers, natural fibers, for example, cotton fibers, or fibrids (U.S. Pat. No. 2,999,788). The viscose containing the fibers is then extruded through a die into the coagulating bath whereupon a gelatinous web is formed.

The viscose solution is usually prepared by reacting the alkali metal cellulose, which has been obtained from cellulose and sodium hydroxide solution, with carbon disulfide in an alkaline medium. The solution usually still contains from about 4 to 20% by weight of cellulose. After ripening, the viscose is spun, i.e., coagulated. The spinning bath contains, for example, about 10 to 20% by weight of sulfuric acid, and also sodium sulfate and/or ammonium sulfate.

In further stages, the fiber-reinforced web-like product consisting of viscose gel is regenerated to cellulose hydrate gel in an acid medium, for example, in dilute (less than or equal to about 5% by weight) sulfuric acid, and the cellulose hydrate gel is washed with water to remove acid and salts, desulfurized, for example, with sodium sulfite solution, optionally passed through a bleaching bath and finally passed through a plasticizing bath containing, for example, aqueous 10 to 20% strength glycerol, sorbitol or glucose solution. See, e.g., French Pat. No. 1,385,394.

The cellulose hydrate gel is converted into regenerated cellulose by intensive drying at from about 90° to 140° C., and the regenerated cellulose is adjusted to a water content of about 5 to 10% by weight by conditioning. The cellulose hydrate webs are from about 20 to 50 μm thick, corresponding to a weight per unit area of from about 27 to 75 g/m².

The term adhesion promoter, with respect to adhesives, is intended to include the conventional substances or substance mixtures which are applied to one or both of the gluing surfaces before application of the adhesive, in order to improve the adhesion between the adhesive and the gluing surfaces. In the present case, it has the object of anchoring the layer of pressure-sensitive adhesive to the web and/or strip of film in a moisture-resistant manner. It is present between the pressure-sensitive adhesive layer and the web and, if necessary, between the pressure-sensitive adhesive layer and the strip of film.

Although in principle the adhesion-promoting layer of resin would only have to be in the region of the surfaces of the continuous web which are to be glued, for industrial reasons, it is expedient to provide the entire area of one surface, and even for certain applications or overlapping gluings both surfaces, of the web, with one or two different adhesion-promoting layers of resin. In addition, the web can also have, on the surface which later forms the inner side of the tubular casing, a customary agent for improving the ease of peeling off the tubular skin, or a layer which is impermeable to gas. The first agents include, for example, water-soluble proteins, such as gelatin, egg albumin and glutenin. However, these agents are only necessary with special adhesion-promoting resins. If hardened, cationic thermosetting resins are present on the inner side of the tubular casing, an adequate ease of peeling off is already ensured without an additional agent.

The essentially water-insoluble adhesion-promoting resin is preferably a hardened cationic thermosetting resin which, in the non-hardened state, is essentially water-soluble and which can be converted into a water-insoluble state by a progressive condensation reaction by the action of heat. See, e.g., U.S. Pat. No. 3,378,379. Copolymers containing vinylidene groups (U.S. Pat. No. 2,748,027, No. 2,961,323, No. 2,961,340, No. 3,108,017, No. 3,144,425 and No. 3,826,676 and German Offenlegungsschrift No. 2,832,926) together with pressure-sensitive adhesives also give outstandingly strong seams when the seam is glued to form the tubular casing, an additional barrier effect against steam and oxygen being achieved. Polyurethane resins, nitrocellulose and other polymers known as water-insoluble anchoring agents can likewise be employed.

The choice of water-insoluble adhesion-promoting resin depends, inter alia, on the intended use of the tubular casing. For sausages intended to be boiled or scalded, wherein the casings must be permeable to steam and smoke, hardened cationic thermosetting resins are preferably used as the anchoring agent. For this, for example, the web of cellulose hydrate is coated with an aqueous solution which contains up to about 25% by weight of a dispersible thermosetting resin, and the coated material is heated to between about 65° to 125° C. until the moisture content is less than about 10% by weight. The resin is hardened to its water-insoluble form by the heating, and is permanently bonded to the surface of the web. Preferably, in the manufacture of the web of cellulose hydrate, the coating solution is applied to the already regenerated but not yet dried gelatinous web. This application can be effected before, at the same time as or after the treatment of the gelatinous web with a plasticizer, such as, for example, a polyol. The layer of resin has a weight per unit area of from about 30 to 300 mg/m², preferably from about 40 to 75 mg/m².

Lower aliphatic or aromatic hydrocarbons, lower alcohols or esters or mixtures of these solvents are employed as suitable solvents for the thermosetting resin. It is advantageous to use an aqueous solution or dispersion.

If desired for certain uses, an additional water-repellent resin, such as paraffin, montan wax or carnauba wax, and/or suitable thickeners, such as cellulose ether or starch, can be applied to the tubular casing together with the thermosetting resin.

The tubular casing can also be printed with inscriptions or decorative patterns before, but preferably after, application of the thermosetting resin and before the gluing. Not only can the printing processes customarily used in the manufacture of seamless sausage casings be employed, but other printing possibilities are also available, since in the present case, the flat web can be printed before shaping of the tube.

The coating of thermosetting resin is, for example, free from pigments and organic dyes and thus forms a clear layer through which any printing remains clearly visible. However, it is also possible to use a transparent organic dyestuff, in order to impart a corresponding color to the packaging casing.

If appropriate, the layer on the tubular casing in the region of the bonding seam can, in addition to the thermosetting resin, contain pigments, a plasticizer for the thermosetting resin and/or a hardening agent for the thermosetting resin. The thermosetting resin and the plastizier are taken up in a suitable liquid solvent or dispersing agent, which advantageously can be evaporated at a temperature at which at least preliminary hardening of the resin can simultaneously occur.

Examples which may be mentioned of thermosetting resins are: urea/aldehyde, melamine/aldehyde and phenol/aldehyde resins. Preferred plasticizers which are used for these thermosetting resins are soft resins of the alkyd type, which cannot be hardened, or dibutyl phthalate, tricresyl phosphates or dibutyl sebacate.

Hardeners which can be employed for the thermosetting resins are, for example, ammonium thiocyanate, toluenesulfonic acid, maleic acid or lactic acid. These compounds act as catalysts in the hardening of the thermosetting resins.

Other suitable thermosetting resins are condensation products of polyamide-polyamines or aliphatic polyamines or of polyamides with bifunctional halohydrins or derivatives thereof, such as, for example, epichlorohydrin. Such resins are described, for example, in U.S. Pat. No. 2,573,956 or in British Pat. No. 865,727 and No. 908,205. A particularly suitable resin is, for example, the reaction product of an aliphatic 2,6-polyamide, ethylenetriamine and epichlorohydrin.

Possible polyamines are simple alkylenediamines, or polyalkylenepolyamines, such as, for example, diethylenetriamine, triethylenetetramine, tetraethylenepentamine and the corresponding polypropylene-polyamines, and polybutylenepolyamines, such as dibutylenetriamine. To manufacture the corresponding chlorohydrin resins, the polyamines are reacted with more than one mole of epichlorohydrin per mole of polyamine. In general, from about 1.5 to 4.0 moles of epichlorohydrin, usually from about 2 to 3 moles, are used. The reaction is carried out in aqueous solution at moderately elevated temperature (about 50° C.), until the desired degree of viscosity is reached. Reaction products of epichlorohydrin and dipropylenetriamine or bis(3-aminopropyl)methylamine are preferably used, with from about 2.8 to 3.8 moles of epichlorohydrin being reacted per mole of polyamine.

The polyamide-polyamines are condensation products of a saturated, aliphatic, dibasic acid which has 3 to 8 carbon atoms in the molecule and one of the abovementioned polyamines which has at least one secondary and two primary amino groups, such as, for example, the abovementioned polyalkylenepolyamines. Diglycolic acid, succinic acid, glutaric acid and adipic acid are preferably used as the dibasic acid. It is also possible to use mixtures of dibasic acids. The mixtures of the acids can also contain acids with more than eight carbon atoms in the molecule, as long as the proportion of these acids in the mixture does not prevent the polyamine-polyamide manufactured from being truly soluble or at least colloidally soluble in water. A proportion of the polyamines which are reacted with the dibasic acid can be replaced by alkylene-diamines. The proportion of alkylenediamines can be up to 30%. The reaction between the polyamine and the dibasic acid is carried out at about 110° to 250° C., usually at about 160° to 210° C. About 0.8 to 1.4 moles of the acid are used per mole of polyamine. The resulting polyamine-polyamides are reacted with from about 0.5 to 1.8 moles of epichlorohydrin per secondary amino group, in aqueous solution, and about 0.9 to 1.5 moles of epichlorohydrin are preferably used.

The resin is applied to the web provided for the coating in the form of an aqueous solution which contains from about 0.3 to 2.0% by weight, preferably from about 1 to 1.3% by weight, of the chlorohydrin resin, and in the case of a cellulose web, which may be fiber-reinforced, the resin is preferably applied to the still moist, not yet dried gelatinous web. However, it is also possible to apply the aqueous solution after the cellulose web has been dried, which indeed has the advantage that solutions with a lower content of resin are required to achieve the same effect. However, this sometimes leads to non-uniform impregnation. After application of the aqueous solution of the anchoring agent, the web is dried at a moderate heat (about 100° C.).

The permeation properties of the packaging casing in the gluing region are not influenced, or they are influenced only to an inconsiderable degree, by the anchoring layer of hardened cationic thermosetting resin. These properties are of particular importance for the permeability toward steam and smoking fumes if the tubular casing is to be used for storage-stable sausages or sausages for boiling or scalding. If the permeability were too low, for example, the typical reddish-brown color shade of the smoked sausage meat would not be obtained.

By the term "pressure-sensitive adhesive" there is generally understood a permanently tacky substance which, in the form free of solvents or dispersing agents, spontaneously adheres to the surfaces of most materials under even a slight pressure. In the present case, it is applied to the overlapping areas either directly in the form of a dispersion or solution, for example, in petroleum hydrocarbons having a boiling range of from about 65° to 95° C., acetone, ethyl acetate, toluene or chlorinated hydrocarbons, or in solvent mixture, for example, acetone/petroleum hydrocarbons, or as a melt. However, it is also possible initially to apply a thin film of the pressure-sensitive adhesive layer to a carrier tape, which consists of a material provided with an anti-adhesive finish, for example, silicone paper or siliconized plastic film. The pressure-sensitive adhesive is then transferred to the overlapping areas, and the carrier tape provided with an anti-adhesive finish is then pulled off from the pressure-sensitive adhesive film. If a strip of film is used for bonding the edge regions of the edge zones of the web which run along the longitudinal axis, the pressure-sensitive adhesive is advantageously first applied to the strip of film. The strip of film is then pressed onto the edge zones in order to glue the edge zones to the pressure-sensitive adhesive layer.

It is also possible to use a strip of film, for example, of cellulose hydrate or polyester, having a coating of pressure-sensitive adhesive on both sides. One of the two tacky surfaces of this strip of film is glued along the longitudinal axis to the entire surface of one of the two edge zones of the continuous web which run along the longitudinal axis, while the other tacky surface of the strip of film is still covered with a removable tape. The tube is then shaped by overlapping the two longitudinal edge zones of the web, with the strip of film being in the overlapping zone between the edge zones. After the protective tape has been pulled off from the second tacky surface, this surface is adhered to the second edge zone.

In contrast to the procedure for coating the web with the adhesion-promoting resin, the pressure-sensitive adhesive should not be applied over the entire surface of the web, but only in the desired gluing region. It is thus usual for appropriately sized strips having a width approximately corresponding to the circumference of the tubular casing to be formed, including the double overlapping width of the edge zones, to be cut out of a web coated with adhesion-promoting resin. As described above, these strips are then provided with the pressure-sensitive adhesive layer along one of the two longitudinal edges.

Raw materials for the pressure-sensitive adhesive are preferably polyacrylates or polymethacrylates, but in principle other pressure-sensitive adhesives are also suitable, as long as they fulfill the requirements made of them, for example, with regard to good resistance to boiling and acceptability from the point of view of foodstuff regulations. Dispersion-type pressure-sensitive adhesives, for example, those based on polyacrylates or vinyl acetate copolymers, optionally with the addition of suitable resins, or hot-melt pressure-sensitive adhesives which, in addition to suitable resins, contain ethylene/vinyl acetate copolymers and styrene/butadiene or styrene/isoprene block copolymers, are also in principle suitable, but these pressure-sensitive adhesives are less preferred because they may not be able to satisfactorily fulfull the requirements made of them over as broad a range as the preferred pressure-sensitive adhesives described above.

The pressure-sensitive adhesive consists of a highly polymeric base resin, which determines the cohesion properties and the specific adhesion, and usually one tackifying resin which can also be replaced by low-molecular portions of the base polymer. Such a resin is predominantly added in dissolved form to the base resin. The following resins, for example, can be used: naturally occuring resins, such as balsam resins, modified naturally occurring resins, for example, those based on hydroabietyl phthalate or esters of colophonium, and polyterpene, terpenephenol, cumarone, indene, ketone and hydrocarbon resins. The addition of tackifying resins indeed increases the surface tackiness and peel strength, but in some cases a reduction in cohesion can thereby occur. To increase the cohesion as well as the heat distortion resistance and shear resistance of the gluing, it is, for example, possible to cross-link the base resin after it has been applied to the bonding strip of film or to the overlapping area. Crosslinking is achieved, for example, with chemical additives at room temperature or by means of heat, by warming to about 130° to 140° C. for about 5 to 15 minutes. In this case, a considerably improved resistance of the glued seam to hot water can also be achieved. For this purpose, it is necessary to add to the adhesive one or more crosslinking agents which undergo a crosslinking reaction with reactive groups of the polymer, or alternatively there is used as the base resin a homopolymer or copolymer containing reactive, i.e., crosslinkable, comonomers which have functional groups, e.g., carboxyl, amide, amino, methylol or hydroxyl groups, and which improve the adhesion properties and/or permit limited crosslinking of the adhesive film. In general, these components with functional groups are indeed advantageous, since they increase the cohesion of the pressure-sensitive adhesive film, but they are not absolutely necessary. Examples of such copolymers which may be mentioned are: anionic copolymers of acrylates, vinyl acetate, an unsaturated carboxylic acid, such as acrylic acid, methacrylic acid or itaconic acid, and a glycidyl compound, such as glycidyl acrylate or glycidyl methacrylate; copolymers with bifunctional monomers, such as triethylene glycol dimethacrylate or diacrylate, and tetramethylene glycol diacrylate or dimethacrylate; copolymers of acrylates, vinyl 1-halogenocarboxylates, such as, for example, vinyl chloroacetate, 1,2-unsaturated carboxylic acids, such as acrylic acid, or unsaturated dicarboxylic acids, and, as the fourth component, a polymerizable unit containing hydroxyl groups; and copolymers of N-methylolacrylamide (or N-methylolmethacrylamide) and acrylates (or methacrylates) which still contain free, non-esterified carboxyl groups, this last copolymer being cross-linked by means of heat with water being split off. Furthermore, N-(1,1-dimethyl-3-oxo)-butyl-acrylamide of the formula

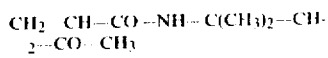

may also be used as the reactive comonomer. The double bond permits copolymerization, while the keto group and the H atoms in the α-position relative to the keto group enable the crosslinking reaction to take place. Crosslinking can be initiated by heating with peroxides. A suitable cross-linkable pressure-sensitive adhesive contains, for example, a copolymer based on acrylates, co-using acrylonitrile and monomers which contain carboxyl groups and which are already cross-linked in the cold, i.e., at room temperature, when alkalis or salts of monovalent or polyvalent metals are added, such as, for example, ammonia, an alkali metal hydroxide solution or an aluminum salt. Other comonomers which may be mentioned are acrylic acid hydrazides and acrylate hydrazones used in acrylic acid ester containing copolymers.

For the tubular casing of cellulose hydrate, polyacrylates are particularly advantageously used as the pressure-sensitive adhesives, the acid groups being esterified with one or more aliphatic alcohols, prefeably a $C_1-C_{12}$ alcohol, and more preferably a $C_4-C_8$ alcohol, such as, for example, butyl alcohol or 2-ethylhexanol.

The adhesive layer can also contain other nontacky additives, such as are customary per se in adhesives, for example, highly viscous thickeners based on homopolymers or copolymers of polyacrylic acid salts or polyvinylpyrrolidone; preservatives to protect the adhesive layer from attack by microorganisms; wetting agents; plasticizers, for example, based on phthalates obtained with straight-chain alcohols (butanol) or branched alcohols (2-ethylhexanol); fillers, such as kaolin, glass beads, chalk, quartz flour, microdolomite, baryte, fine-grained sand and zinc oxide; and pigments and organic and inorganic dyestuffs in the form of powders or flakes.

The width of the adhesive film in the overlapping seam is chosen between about 3 to 70 mm, depending on the desired strength values and diameters, and is advantageously about 5 to 15% of the final circumference of the casing. If a tacky strip of film is used for the overlapping bonding of a butt seam formed from the edge zones of the web, adhesive films which are twice as wide are correspondingly necessary. Because of the lower requirement of material and the better flexibility of the tubular casing, which is a property which is of great importance particularly when shirring sausage casings, overlapping glueing of the longitudinal edges of a web is preferable to gluing a butt seam with an adhesive tape. The thickness of the adhesive film is from about 20 to 150 μm, preferably from about 40 to 50 μm.

As is known, bonds produced with pressure-sensitive adhesives can be separated and joined together again several times. It is therefore completely surprising that precisely these adhesives in combination with one of the above-mentioned adhesion-promoting resins, as the priming layer, form a sufficiently strong seam when webs are glued to form tubular casings. During the manufacture of sausages, the seam is exposed to hot water at about 80° C. for a relatively long period while the sausage is scalded, and during shirring, filling, twisting, tying off or clipping and the like, the seam must withstand high mechanical load and stresses, and changes in dimension occur. Notwithstanding these facts, it has been found that this combination of adhesion-promoting resin and pressure-sensitive adhesive, indeed because of its elastic character, is even superior to the resins described earlier. Thus, because they are permanently tacky, the pressure-sensitive adhesives have the advantage that they can be bonded together rapidly and simply on the parts to be bonded, with a sufficient adhesive strength against shearing forces. By shearing forces there is to be understood the action of tangential tensile forces on the glued seam, perpendicular to the longitudinal axis of the tubular casing.

It has been found that the tear strength of glued points of 35 to 45 N/15 mm of sample width is in the same range as the tear strength of the material from which the tubular casing is made.

However, it has been found that a layer of pressure-sensitive adhesive applied in the customary manner usually does not ensure sufficient permeability to smoke. After smoking, glued tubular casings filled with sausage meat, in particular tubes of regenerated cellulose, exhibit no smoked color, or only an incomplete smoked color in the region of the all-over glued seam.

It is known that the smoked coloration arises by reaction of phenols and carboxyl compounds with proteins, its intensity and stability depending, in particular, on the water content of the casing, the pH value of the substrate and the period and level of heating. Therefore, the volatile carboxylic acids which form the main component of the smoke and are particularly decisive for the coloration must be able to pass through the seam region of the tubular casing.

The permeability to smoke can be tested, for example, with a commercially available portable smoking unit. Smoking sawdust, for example, beechwood sawdust, which is heated externally with a fuel burner or electric hotplate and provides smouldering smoke is used as a source of smoke. In order to simulate "moist smoking", a supply of water is present in the chamber in which the smoke is produced, in order to moisten the atmosphere. The room temperature is measured with a thermometer.

In order to improve the permeability to smoke, according to the invention, the layer of pressure-sensitive adhesive is not applied in a continuous covering manner, but with interruptions or exclusions. The layer of pressure-sensitive adhesive can also be applied in strips or as a punctiform screen pattern, for example, with a profiled roller which imparts a structure to the pressure-sensitive adhesive layer. The applicator roller can also have a textile structure or a brush surface.

Particularly advantageous is the application of a dispersion of pressure-sensitive adhesive, for example, in a regular punctiform or linear grid structure, by rotary screen printing or gravure printing, which can be carried out at a rate of up to 100 m/minute. A layer thickness of the pressure-sensitive adhesive of from about 25 to 30 μm with a surface coverage of from about 40 to 60% results in an excellent permeability to smoke coupled with sufficient strength of the bonding seam. The same success is achieved with openings, pores or perforations in the layer of pressure-sensitive adhesive, and if appropriate, also in the edge regions of the web. It is also possible for the diameter of these passages to be in the micrometer or nanometer range. These openings, pores or perforations can be produced mechanically, for example, by stamping, embossing, hole-punching or needle-punching, with the diameter being about 0.7-1.2 mm. Suitable passages can also be produced by a chemical route, for example, by partially dissolving the layer of pressure-sensitive adhesive.

It is furthermore possible to incorporate into the pressure-sensitive adhesive a pulverulent substance which can be extracted, for example, a polymer, such as starch, polystyrene or sugar, or a salt, for example, sodium chloride or sodium bicarbonate. After application of the pressure-sensitive adhesive to the strip of film or to the longitudinal edge zones of the web, the pulverant substance is dissolved out, to form pores. It is also possible, to mix with the pressure-sensitive adhesive an additive which is permeable to smoke, for example, a porous substance or organic pigments with a high permeability to smoke or gas. Precipitation reactions, such as are known for the manufacture of microporous films and membranes, can also improve the permeability of the layer of pressure-sensitive adhesive to smoke or gas. For this purpose, the pressure-sensitive adhesive is mixed in two volatile solvents which are miscible with one another, the mixture is spread onto a carrier film or onto the edge zones to be bonded and the solvents are evaporated, whereupon the polymeric material coagulates to form a porous structure. The pressure-sensitive adhesive or the polymeric parts of the pressure-sensitive adhesive are sparingly soluble or insoluble in one of the solvents. Alternatively, it is also possible for the pressure-sensitive adhesive to be dissolved or dispersed in a solvent and, for example, after application to the bonding surfaces of the web, for the solution to be coagulated with a liquid precipitating agent which is miscible with the solvent. In order to improve the permeability to gas and smoke, it is also possible to add to the layer of pressure-sensitive adhesive finely pulverulent thermoplastic which forms a microporous structure in this layer at elevated temperature by sintering. The permeability of the layer of pressure-sensitive adhesive to gas and smoke can also be improved by adding gases, for example, air, nitrogen, carbon dioxide or fluorinated hydrocarbons, in the form of small bubbles, which are expanded, if appropriate, under the influence of heat. This layer of pressure-sensitive adhesive is sprayed, for example, onto the edge zones. The gas can also be produced by adding an agent which forms a gas under the influence of heat, for example, azo compounds or carbonates.

The layer of pressure-sensitive adhesive may also, in some cases additionally contain a textile sheet-like, strip-like, chain-like or filament-like structure, for example, a non-woven fiber stustance, which is bonded by an adhesive, mechanically or by means of heat, and which is made of spinning fibers, filaments or multiple filament yarns of natural or synthetic material which are deposited randomly or in an ordered fashion, or a woven material, network, lattice or the like or a sponge or foam film, in particular with an open-cell structure. It has been found, surprisingly, that the embodiments described for the tubular casing having a good permeability to smoke in the gluing region are sufficiently stable and have a sufficient resistance to mechanical stress and heat.

If a tubular casing which is impermeable to gas is to be manufactured, the water-insoluble adhesion-promoting resin consists of a vinylidene resin which is usually present with a weight per unit area of about 3 to 12 g/m$^2$. These resins include film-forming resins which are obtained by copolymerization of monomers, wherein at least one component contains a vinylidene group. In general, film-forming vinylidene resins which contain at least about 5% by weight, but preferably at least about 80% by weight of vinylidene chloride in the polymerized molecule can be used. Comonomers which may be mentioned are: vinyl chloride, vinyl bromide, vinyl acetate, vinyl propionate, vinyl chloroacetate, alkyl acrylates or methacrylates, such as, for example, methyl, ethyl, propyl, butyl, isobutyl, methoxyethyl or chloroethyl acrylate or methacrylate, methyl vinyl ketone, methyl isopropenyl ketone, acrylonitrile, methacrylonitrile, styrene, vinylnaphthalene, ehtyl vinyl ether, butyl vinyl ether, N-vinyl phthalimide, N-vinyl succinimide, N-vinylcarbazole, methylene-diethyl malonate, unsaturated organic acids, such as itaconic acid, or mixtures of these compounds. In addition to vinylidene chloride, the copolymer can contain one to three of these comonomers.

The vinylidene resin, or a mixture of the vinylidene resin, is used with or without other resins and with or without a plasticizer, such as, for example, esters of phthalic acid, such as dibutyl phthalate, or esters of citric acid, such as tributyl acetyl-citrate, or of sebacic acid or tartaric acid, such as diisobutyl tartrate.

The vinylidene resin is applied to the carrier web with an anchoring agent customary for this purpose, for example, with one of the above-mentioned hardened cationic thermosetting resins, or directly, in the form of aqueous or non-aqueous mixtures, such as dispersions or emulsions, or in the form of a latex, or in the form of solutions in water or organic solvents or in the form of melts. The carrier web of regenerated cellulose can be in the dried state, in the remoistened state or in the not yet dried gelatinous state. After application, the dispersing agent or solvent is removed, for example, by heating with hot air and/or by infra-red heating. The web is usually dried to a moisture content of less than about 15% by weight, preferably from about 5 to 10% by weight. Further sintering of the coating at an elevated temperature is only necessary if particularly firm adhesion of the coating to the carrier is desired. In general, a coating thickness in the range from about 0.05 to 0.5 mm is sufficient.

Tubular casings provided with vinylidene resins as an anchoring layer are essentially impermeable to gas and are suitable, for example, for sausages of the liver sausage type.

For packaging meat products in the form of sausage emulsions, it is customary to employ shirred, seamless tubular casings which progressively unfold as the sausage emulsion is stuffed thereinto. These shirred casings, also called sticks or hollow rods in the trade, have hitherto been manufactured from long, seamless tubes which are conveyed in the direction of their longitudinal axis and are shirred against an opposing force. The length of the shirred casing is usually only 1 to 3% of the original length.

Surprisingly, it has now been found that the tubular casing of the invention (in spite of the thickening in the region of the glueing as a result of the overlapping of the edges or of the tape covering the two edges) can be excellently shirred. The tubular casings manufactured in the examples are shirred, for example, by the process known from U.S. Patents No. 3,988,804 and No. 4,185,358, and using the device described therein.

According to this process, the force used for shirring is applied by at least one element rotating around the longitudinal axis of the tubular casing. In particular, the element used for shirring is continuously in force-transmitting engagement with the tubular casing during the shirring operation and transmits onto the tubular casing the pressure which is sufficient to form a stick which is flexurally rigid. Before the actual shirring operation, an impression in the form of an exact, continuous helix is advantageously imprinted on the casing to be shirred. It is expedient, before the shirring operation, for a lubricant and/or moistening agent to be applied to the outside of the tubular casing to be shirred. A suitable device for this process consists of a shirring organ and an abutment, the shirring organ comprising an annular member which surrounds the tubular casing and can be rotated around it. The element which is used for shirring and which is in engagement with the tubular casing is attached to the shirring organ.

The element used for shirring is preferably designed as a helically threaded projection in the cylindrical inside of the annular member. In particular, the annular member has a helically threaded inner groove in which is inserted a correspondingly threaded element which stands out from the cylindrical inner side of the casing as a screw thread. This threaded element is appropriately made of a material with advantageous slip properties, and is multi-thread in design. The annular member and the helically threaded projection are usually made as one piece. The two above-cited U.S. Patents are referred to for details of this device. However, as a deviation from the process described therein, in the case of the tubular casing of the invention it is advantageous not to secure the casing against twisting about its axis, and to control continuous twisting of the casing about its axis. This is effected, for example, by using a shirring mandrel which is smaller than that customarily used so that the seam zone, which is relatively thick as a result of the adhesive strip or as a result of the overlapping, is arranged spirally around the longitudinal axis of the shirred tubular casing, it being possible to achieve a shirring ratio of from about 1:70 to 1:80.

The shirred tubes are filled (about 20 m/minute) with a sausage meat of the type used for sausages intended for boiling or scalding and are wound up mechanically, scalded at about 70° to 80° C., smoked, and cooled with water.

Sausages are obtained having a uniform shape and a skin which can be peeled off and lies close against the sausage mixture.

If, for example, the tubular casing is envisaged for sensitive foodstuffs, the web or the tubular casing is sterilized by customary methods, such as, for example, heat treatment or ozone treatment or high-frequency radiation.

The tubular casings of the invention can be produced at a higher speed than hitherto. For example, in the case of the manufacture of webs of regenerated cellulose by the viscose process, the spinning process can be carried out more rapidly, as can coating of the webs with the water-insoluble resin and printing. In addition to flexographic printing, high-grade gravure printing is also possible. Furthermore, the web can be printed with an all-round print or with a front and back print. The flavor of the sausage composition is not affected when the casing is used as a sausage casing. The sausage casing exhibits a high resistance to elongation stresses and volume stability during filling with sausage emulsion, handling and processing. It can also be stored at low temperatures, and can easily be cut up.

The invention will be further illustrated with reference to the following examples.

EXAMPLE 1

One surface of a web of regenerated cellulose which is prepared by the viscose process and has a thickness of 38 μm, a weight per unit area of 55 g/m², a water content of 7%, a swelling value of 165% and a permeability to water vapor of 700 g/m².24 hours is coated with a 1% strength aqueous solution of a modified melamine-/formaldehyde resin (Accobond from ACC) on a customary coating unit with roller applicators and drying stations. After drying the web at about 125° C. in a stream of air, a layer of resin with a weight per unit area of 47 mg/m² remains. The permeability of the coated web to water vapor is 710 g/m² 24 hours, and is thus almost unchanged.

In all the examples, the permeability to water vapor is determined gravimetrically in accordance with the method of DIN 53,122, a constant moist-warm climate (DIN 50,015, 40° C., 92% relative humidity) being present in the vaporization chamber. The test unit used is a climatically controlled testing cabinet of the type manufactured by Messrs. Karl Weiss, Giessen, Germany.

The maximum absorption of liquid water at room temperature after 24 hours (swelling value), determined gravimetrically, also remains almost unchanged at 162%.

The changes in dimension, that is to say the change in area (A) and thickness (B), during absorption of water (=swelling capacity) as a result of keeping the web in liquid water at 75° C. for 10 minutes, and the subsequent release of water as a result of keeping the web in a normal climate (DIN 50,014, 23° C., 50% relative humidity) are not substantially changed by coating the web with the adhesion-promoting resin: Change in area (A) and thickness (B) of the cellulose web

|  |  | (A) | (B) |
| --- | --- | --- | --- |
| during absorption of water | before coating | +3% | +128% |
|  | after coating | +4% | +132% |
| during release of water | before coating | −20% | +10% |
|  | after coating | −16% | +12% |

The coated web, which is 75.5 mm wide, is curved using shaping templates to form a tube which is supported by a pipe surrounding the tube. The faces of the longitudinal edges of the web touch. The surface coated with resin is on the outside of the tube. A 12 mm wide adhesive tape which contains a pressure-sensitive adhesive and consists of a 12 μm thick stretch-oriented polyethylene terephthalate film and a pressure-sensitive adhesive layer based on a copolymer of acrylate containing carboxyl groups, with the co-use of acrylonitrile (Acronal 85D from BASF) is placed on the seam formed by pushing the edges together with the two edge zones being covered symmetrically. The aqueous dispersion of the pressure-sensitive adhesive has a viscosity at 25° C. of 70 to 150 mPa.s (Contraves Rheometer STV, B III) and a pH value (DIN 53,785) of 2 to 3. By applying pressure, for example with a roller, the edges pushed against one another are bonded with the adhesive tape to form a water-tight seam.

The tensile strength of the seam is measured in accordance with the method of DIN 53,455 on a sample conditioned in a normal climate (DIN 50,014, 23° C., 50% relative humidity). The tear strength is 43 N/15 mm and the elongation at break (DIN 53,455) is 35%.

The strength of the sample in the wet state is investigated, the strength being measured after the sample has been kept in hot water at 80° C. for 30 minutes. The tear strength is 7 N/15 mm and the elongation at break is 55%. As a modification of Example 1, it is also possible to use an adhesive tape with a carrier film of cellulose hydrate (Tesafilm 101 from Messrs. Beiersdorf). The mechanical properties of the tubular casing are essentially identical.

EXAMPLE 2

A web of regenerated cellulose which is prepared by the viscose process and has a thickness of 34 μm, a water content of 7% and a width of 81.5 mm is coated on both sides with the thermosetting resin of Example 1 at a weight per unit area of 48 mg/m² on each surface and is dried.

A coating about 6 mm wide in each case containing a different pressure-sensitive adhesive, is applied in each case along one of the two longitudinal edges. The adhesive applied is, in the first case, a pre-crosslinked approximately 30% strength plasticizer-free solution, which crosslinks rapidly under the action of heat, of an acrylate copolymer containing carboxyl groups in petroleum hydrocarbon with a boiling range of about 65° to 95° C. (Acronal DS 3110 from BASF). The viscosity of the solution at 25° C. is 0.8 to 2.5 mPa.s (Epprecht viscosimeter, STV, C III). In the second case, the pressure-sensitive adhesive is an aqueous plasticizer-free, anionic dispersion of a polymer based on a butyl acrylate (Acronal 4D from BASF). The solids content (DIN 53,189) is about 50% and the viscosity of the dispersion at 25° C. (Epprecht viscosimeter, STV, A III) is about 15 to 38 mPa.s. In the third case, the pressure-sensitive adhesive is an aqueous, fine-particled, plasticizer-free, anionic dispersion of a copolymer, which can be crosslinked in the cold when alkali is added and contains carboxyl groups, based on acrylates with the co-use of acrylonitrile, the dispersion having a solids content (DIN 53,189) of about 50%, a viscosity at 25° C. (Contraves Rheometer, STV, B III) of 100-220 mPa.s and a pH value of 4.5 to 5.5 (Acronal 80D from BASF). The pressure-sensitive adhesive mentioned last is post-crosslinked with aqueous alkali solution after application to the web. In all cases, the solvent or water is removed by the action of heat.

Each web is then shaped to a tube, the edge zone which is free from adhesive overlapping the edge zone containing adhesive. The edge zones are glued together in this manner, a seam running along the longitudinal axis being formed.

After the gluing operation, the first sausage casing is subjected to the action of heat, for example, by being boiled in hot water, whereupon post-crosslinking occurs.

The mechanical properties of the climatically conditioned samples (normal climate of 23° C., 50% relative humidity) in the dry state, on the one hand, and of the samples tested in the wet state after being kept in hot water at 80° C. for 30 minutes (wet), on the other hand, are as follows:

|  |  | Acronal DS 3110 | Acronal 4D | Acronal 80D |
| --- | --- | --- | --- | --- |
| Tear strength (N/15 mm) | dry | 35 | 38 | 39 |
| Elongation at break (%) | dry | 68 | 75 | 80 |
| Tear strength (N/15 mm) | wet | 6.5 | 7.0 | 7.6 |
| Elongation at break (%) | wet | 58 | 71 | 79 |

EXAMPLE 3

An 82 mm wide web of regenerated cellulose which is prepared by the viscose process and is 40 μm thick and has a weight per unti area of 58 g/m$^2$ is coated on both sides with a thermosetting resin and dried analogously to Example 2. The resin is a reaction product of aliphatic 2, 6-polyamide, ethylenetriamine and epichlorohydrin (Resamin VHW 61/1 from Cassella). To one of the two edge zones running along the longitudinal axis of this web is glued, in a continuous film fashion, a tape which has a layer of pressure-sensitive adhesive based on polyacrylate on both sides and a width of about 6 mm (Scotch tape 927 from 3M) and which runs along the longitudinal axis. The second adhesive surface of the tape which faces away from the edge zone is covered with a layer of siliconized paper. Each adhesive layer is about 50 μm thick and 6 mm wide. The edge zone covered with the double-sided adhesive tape and the double-sided adhesive tape are perforated by needles with holes having a diameter of about 0.9 mm and an average separation of about 2 mm being formed. After pulling off the layer of paper from the second adhesive layer, the longitudinal edge zone free from adhesive is placed on the other edge zone in overlapping fashion and glued to the second layer of adhesive to form a tube.

After customary filling with sausage meat and smoking at 65° C. for 30 minutes, the sausage casing exhibits a uniform, typically reddish-brown smoked color, even in the region of the gluing zone. This is attributed to a good permeability to smoke also in this region.

EXAMPLE 4

The web of Example 3 pre-treated with thermosetting resin is coated to a width of about 7 mm with the pressure-sensitive adhesive solution of Example 2 along one of the two longitudinal edges using a gravure cylinder and a doctor. The gravure cylinder has 20 cells per cm. After evaporating the solvent, the edge zone of the web has a lozenge-shaped pattern of adhesive applied in the form of dots. The dots of adhesive have a diameter of about 0.5 to 0.6 mm and are 20 μm high, and cover about 40% of the surface of a 7 mm wide strip running along the longitudinal axis.

The two longitudinal edge zones are glued together in overlapping fashion to form a tube. After customary filling with sausage meat and smoking at 65° C. for 30 minutes, the tubular casing exhibits a uniform, typically reddish-brown smoked color, even in the region of the gluing zone, and no lozenge-shaped pattern of pale, unsmoked sausagemeat corresponding to the adhesive applied is recognizable. The casing otherwise has the same properties as the tubular casing manufactured in Example 2.

EXAMPLE 5

A high-strength, aqueous, plasticizer-free, anionic dispersion of a pressure-sensitive adhesive based on an acrylate copolymer containing hydroxyl groups, which dispersion has a solids content (DIN 53,189) of about 70%, a viscosity at 25° C. (Contraves Rheometer STV, C III) of 800 to 2,500 mPa.s and a pH value (DIN 53,785) of 3.5 to 4.5 (Acronal DS 3163 from BASF), is printed onto one of the two longitudinal edge zones of the web by means of screen printing using a 40 mesh stencile and a coating doctor. A regular dot-like layer of adhesive is applied, the individual dots having a diameter of about 0.45 mm and a height of about 25 to 30 μm and covering about 50% of the area of an approximately 5 mm wide strip running along the longitudinal axis. The tube is formed in a manner analogous to that in Example 4. The gluing area of this tubular casing is also sufficiently permeable to smoke.

EXAMPLE 6

The pressure-sensitive adhesive dispersion used in Example 5 is diluted with water to a volume ratio of about 1:1, sprayed onto a siliconized paper with a compressed air spraying nozzle havine a nozzle diameter of 0.5 mm and a pressure of 0.5 bar and dried. The resulting pressure-sensitive adhesive layer has an open-pore structure with openings which pass completely through and have a diameter in the range from about 100 to 400 μm.

The coated paper is cut into strips 6 mm wide, and the strips are glued in continuous film fashion in the direction of their longitudinal axis onto one of the two longitudinal edge zones of a web of regenerated cellulose. These two surfaces of the web are pre-coated with a cationic thermosetting resin which has been hardened by means of heat.

After forming the tube via a shaping shoulder, the edge zones of the web overlap by about 7 mm. At the same time, or thereafter, the protective paper is pulled off and the second area of adhesive, which is now exposed is then immediately bonded to the second edge zone of the cellulose web by means of pressure, for example, with a roller. The resulting tubular casing has a good permeability to water vapor and smoke and excellent mechanical properties.

EXAMPLE 7

Crystalline sodium chloride with a particle size of 0.02 to 0.2 mm is stirred into the pressure-sensitive adhesive solution of Example 2 until a concentration of about 30% by weight is reached. The heterogeneous mixture is applied, in a width of 6 mm using a coating surface, to one of the two longitudinal edge zones of a regenerated cellulose web, and is freed from the solvent by heating. The salt is extracted by treating the coated web with water. The web is then dried.

A layer of adhesive which has a porous structure is obtained. After the overlapping and gluing of the edge zones described in Example 2, a tubular casing with a good permeability to smoke in the gluing region is obtained.

The tubes obtained in the examples are filled with water and remain completely sealed in the region of the glued seam after storage in air at room temperature for several days and after being suspended in hot water at 80° C. for several hours. They also withstand an internal pressure of 1 bar which is produced with water or compressed air.

Referring now to the drawings, in FIG. 1, the regions of the web 4 which are close to the edges 1 and 2 run along the longitudinal axis and are glued together in overlapping fashion. The layer 3 which contains the pressure-sensitive adhesive is interposed between the overlapping regions. The adhesion-promoting layers of resin on the surfaces of the piece or web are labeled 5a and 5b.

Figure 2:
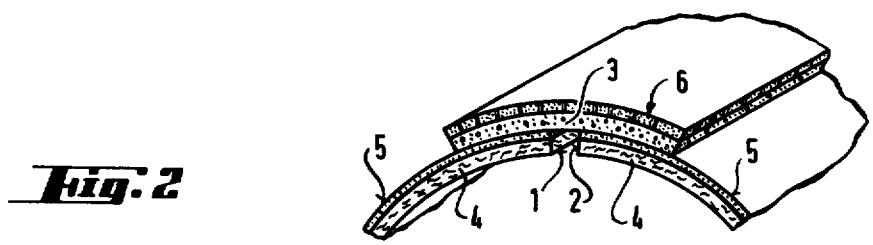
Figure 3:
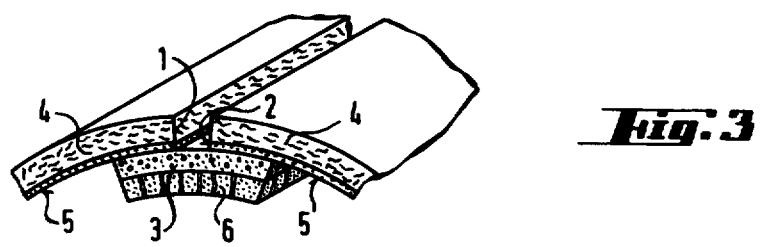

In FIGS. 2 and 3, the edges 1 and 2 of the web 4 are pushed together and are bonded, via a layer 3 containing pressure-sensitive adhesive and an adhesion-promoting layer of resin 5, with a strip of film 6 which covers the two edges either on the outside, as in FIG. 2, or on the inside, as in FIG. 3. It is also possible for one strip of film to be on the outside and a second strip of film to be on the inside of the tubular casing.

Figure 4:
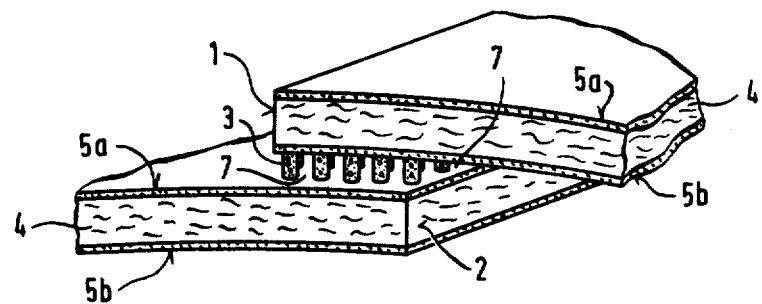
FIGS. 4 and 5 are isolated cross-sectional views illustrating embodiments of the tubular casing which are permeable to smoke, again with only the overlapping region being shown.

FIG. 4 shows the gluing region of a tubular casing which is to be glued analogously to FIG. 1, and the reference figures also have the same meaning. Passages 7 extend through the adhesive layer 3 which has been applied in a punctiform structure.

Figure 5:
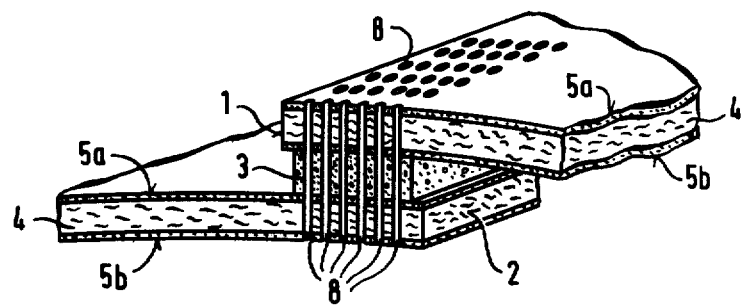

FIG. 5 shows a further embodiment of the gluing region shown in FIG. 4. Perforations 8 in the region of the edges 1 and 2 extend through the entire seam, including the web 4 and the adhesive layer 3.

For reasons of better clarity, the figures shown in the figures are not shown according to scale.

Figure 6:
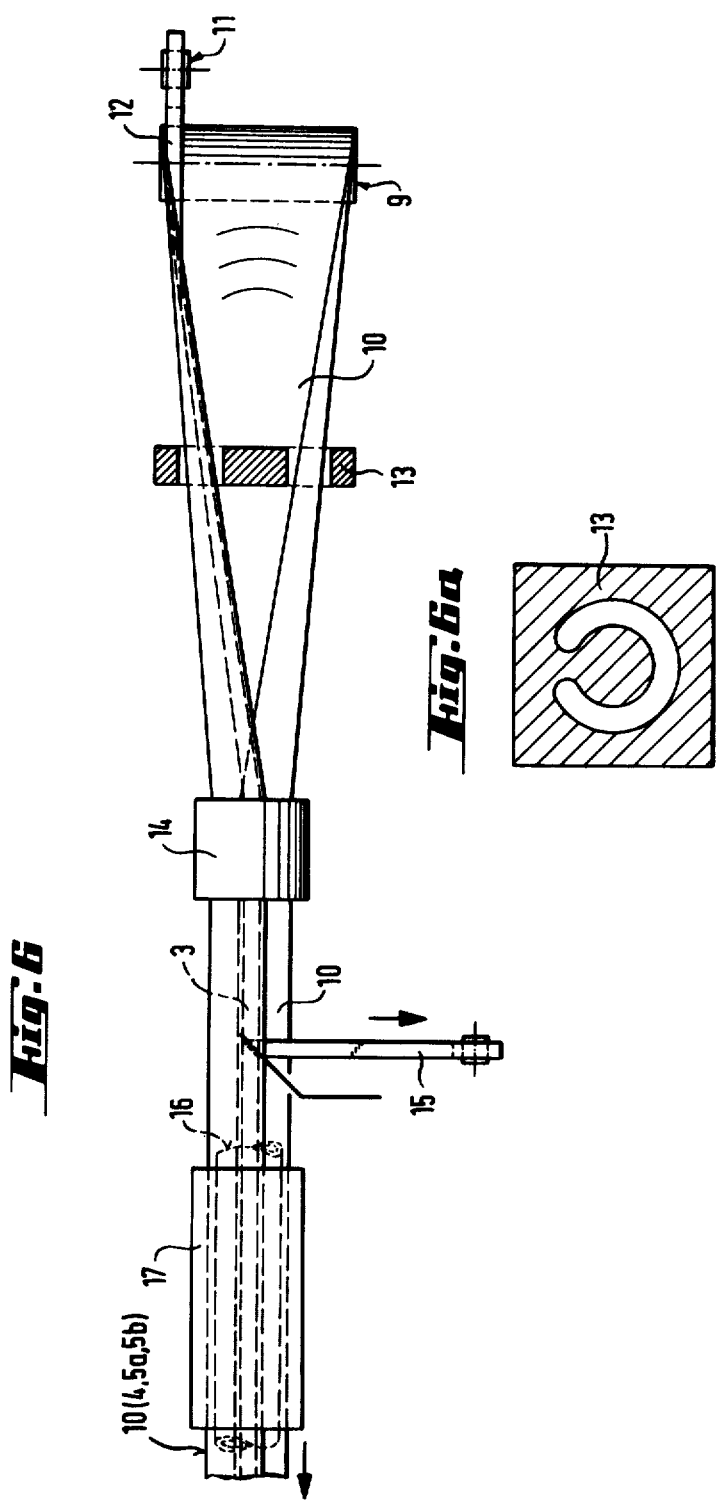

The course of one process for shaping the tube and gluing the edge regions can be seen from FIG. 6. The web 10 is drawn off from a reel 9. Adhesive tape 12 is drawn off from a reel 11 and is glued to the web 10 in the edge region of the web 10. The combined structure passes through a shaping template 13 (shown in section in FIG. 6a) and an overlapping aid 14. The paper carrier layer 15 is then pulled off from the adhesive tape 12, and the inner edge region of the now tubular web 10 is glued to the now exposed surface of the pressure-sensitive adhesive layer. The web 10 then passes through the schematically shown supporting pipe 16 with the surrounding sleeve 17.

Figure 7:
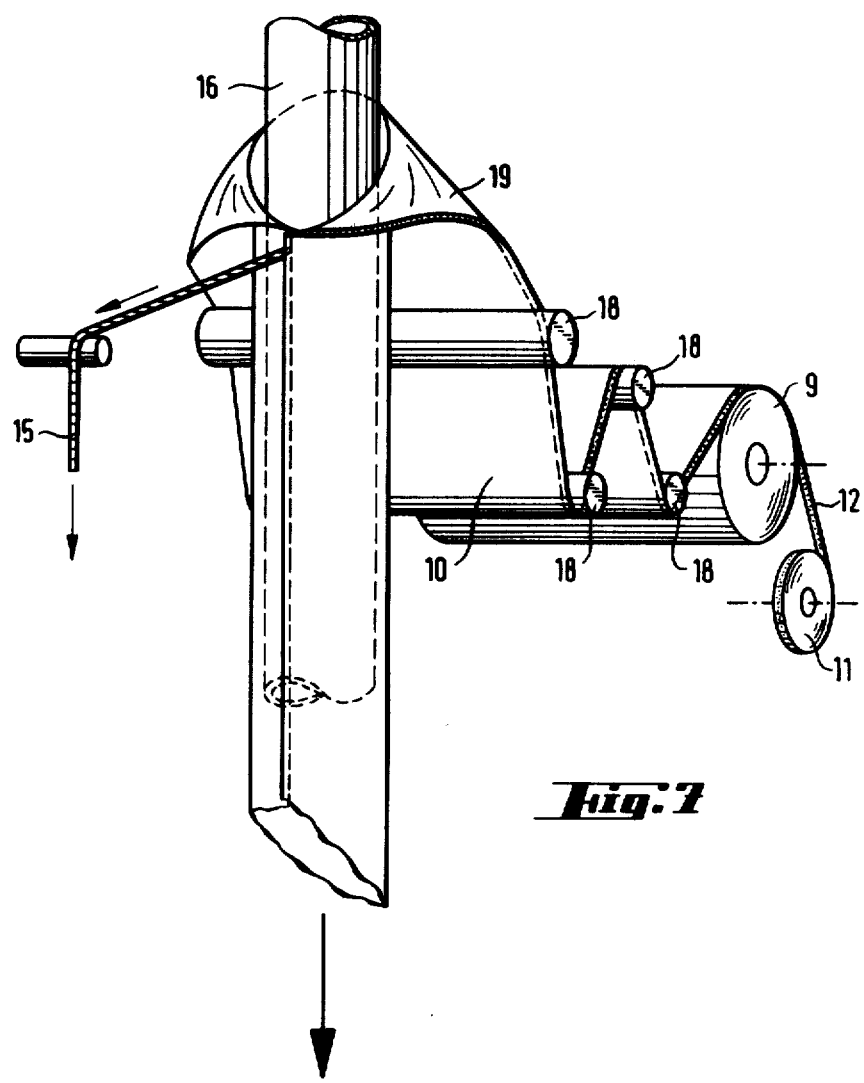
FIG. 7 is a schematic illustration of another process for producing the tubular casings of the invention.

In FIG. 7, an alternate procedure is illustrated wherein the tube is formed by means of a shaping shoulder. By a process analogous to that shown in FIG. 6, the web 10 is glued at its region to an adhesive tape 12, passed over rolls 18 and is shaped into a tube on the shaping shoulder 19. After pulling off the paper carrier layer 15, the exposed surface of the pressure-sensitive adhesive layer is glued to the inner edge portion of the web.

Figure 8:
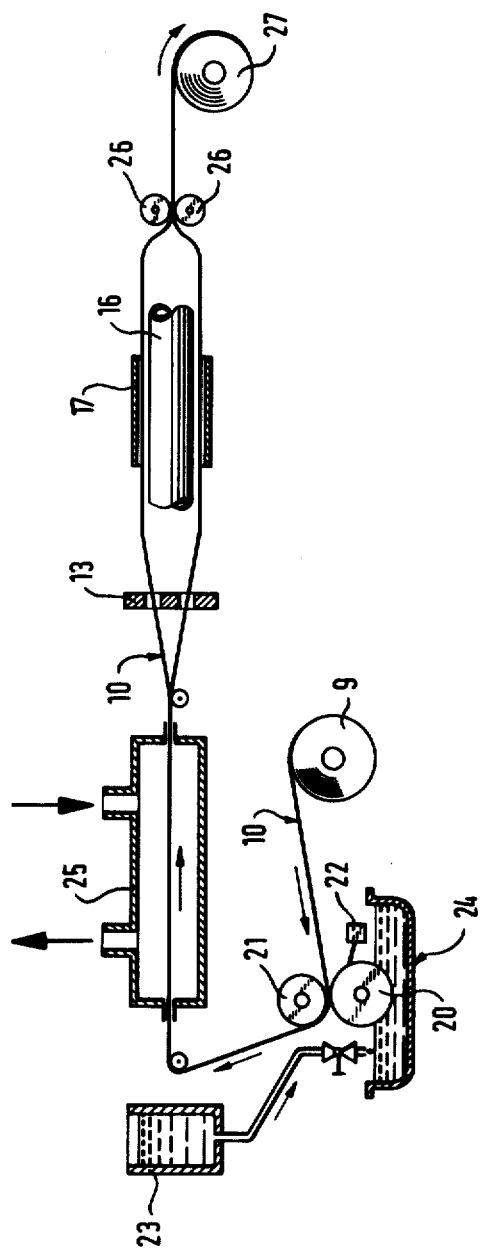
FIG. 8 is a schematic illustration of a third process for producing the tubular casings of the invention.

FIG. 8 shows a further embodiment of the process involving direct application of the adhesive to the flat web. A web 10 of regenerated cellulose is passed from the stock reel 9 into a gravure printing applicator which consists of an applicator roll 20 having a screen pattern, a doctor 22 and a counter-roll 21. The solution or dispersion of adhesive is conveyed from the stock tank 23 to the trough 24. The adhesive, which has been applied in the form of strips, is dried in the drying tunnel 25. The web 10 is shaped into a tube with an overlapped lengthwise seam by means of the shaping template 13, supporting pipe 16 and surrounding sleeve 17. It is then flattened with a pair of take-off rolls 26 and conveyed to the winding-up device 27.

What is claimed is:

1. A seamed tubular casing suitable for containing foodstuffs, comprising:
    a web of material curved about its longitudinal axis in such a manner that its two longitudinal edge regions are positioned to form a seam;
    a layer of substantially water-insoluble adhesion-promoting resin covering at least one of the inside and outside surfaces of said web in at least the area of said two edge regions;
    a strip of film applied to said longitudinal edge regions forming the seam; and
    a layer of pressure-sensitive adhesive interposed between said strip of film and the edge regions of said web of material, whereby the seam is sealed by said strip of film, via said layer of pressure-sensitive adhesive and said layer of adhesion-promoting resin.

2. A tubular casing as claimed in claim 1, wherein said edge regions overlap one another and said strip of film is interposed between the overlapped edge regions.

3. A tubular casing as claimed in claim 2, wherein said strip of film between the overlapping edge regions includes a layer of adhesive on both sides and wherein at least one of said adhesive layers comprises said layer of a pressure-sensitive adhesive.

4. A tubular casing as defined in claim 1, wherein said edges lie in edge-to-edge relationship and said strip of film overlies at least one of the inside and outside surfaces of the web.

5. A tubular casing as claimed in claim 4, comprising two of said strips of film, one overlying the inside surface of said web and the other overlying the outside surface of said web.

6. A tubular casing as claimed in claim 1, wherein said strip of film and said edge zones are permeable to smoke, and wherein said layer of pressure-sensitive adhesive includes openings to improve the permeability to smoke.

7. A tubular casing as claimed in claim 6, wherein at least one of said strip of film and said layer of pressure-sensitive adhesive comprises a sheet-like textile structure, a sponge, a foam, a microporous film or a microporous membrane.

8. A tubular casing according to claim 1, wherein said strip of film comprises regenerated cellulose.

9. A tubular casing as claimed in claim 1 or 8, wherein said web of material comprises regenerated cellulose.

10. A tubular casing as claimed in claim 9, wherein said web of regenerated cellulose includes a fiber reinforcement therein.

11. A tubular casing as claimed in claim 1 or 8, wherein said substantially water-insoluble adhesion-promoting resin comprises a polymer containing vinylidene groups.

12. A tubular casing as claimed in claim 1 or 8, wherein said adhesion-promoting resin comprises a hardened cationic thermosetting resin selected from a urea/formaldehyde, melamine/formaldehyde or phenol/formaldehyde resin or a condensation product of a polyamide-polyamine, an aliphatic polyamine or a polyamide with a bifunctional halohydrin or a derivative thereof.

13. A tubular casing as claimed in claim 1 or 8, wherein said bifunctional halohydrin comprises epichlorohydrin.

14. A tubular casing as claimed in claim 1 or 8, wherein said pressure-sensitive adhesive comprises a polyacrylate or polymethacrylate.

15. A tubular casing as claimed in claim 14, wherein said pressure-sensitive adhesive comprises a resin which can be crosslinked by means of heat and/or chemically.

16. A tubular casing as claimed in claim 15, wherein said pressure-sensitive adhesive contains a copolymer with reactive comonomers.

17. A tubular casing as claimed in claim 16, wherein said pressure-sensitive adhesive contains a resin based on an acrylate copolymer containing carboxyl groups.

18. A tubular casing as claimed in claim 1 or 8, wherein said pressure-sensitive adhesive contains a resin based on a homo-polymer or copolymer comprising acrylate and acrylonitrile monomers.

19. A tubular casing as claimed in claim 18, wherein said acrylate monomer comprises butylacrylate or 2-ethylhexylacrylate.

20. A tubular casing as claimed in claim 1 or 8, wherein the casing is shirred and the seam region is arranged spirally around the lengthwise axis of the shirred tubular casing in at least a part of the tubular casing.

21. A seamed tubular casing suitable for containing foodstuffs, comprising:
   a web of material curved about its longitudinal axis in such a manner that its two longitudinal edge regions are overlapped to form a seam;
   a layer of substantially water-insoluble adhesion-promoting resin applied to both the inside and outside surfaces of said web in at least the area of said two edge regions; and
   a layer of pressure-sensitive adhesive interposed between said overlapping edge regions, whereby the seam is sealed via said layer of pressure-sensitive adhesive and said layer of adhesion-promoting resin.

22. A tubular casing according to claim 21, wherein said layer of pressure-sensitive adhesive includes openings to improve the permeability to smoke.

* * * * *